(12) United States Patent
Iwata et al.

(10) Patent No.: US 9,100,560 B2
(45) Date of Patent: Aug. 4, 2015

(54) CAMERA MODULE

(71) Applicant: Kabushiki Kaisha Toshiba, Minato-ku (JP)

(72) Inventors: Katsuo Iwata, Kanagawa (JP);
Takayuki Ogasahara, Kanagawa (JP);
Kazuhiro Nagata, Kanagawa (JP);
Ninao Sato, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 25 days.

(21) Appl. No.: 14/163,106

(22) Filed: Jan. 24, 2014

(65) Prior Publication Data
US 2014/0267844 A1    Sep. 18, 2014

(30) Foreign Application Priority Data

Mar. 14, 2013    (JP) ................................. 2013-051597

(51) Int. Cl.
*H04N 5/225*    (2006.01)
*H04N 5/232*    (2006.01)
(Continued)

(52) U.S. Cl.
CPC .......... *H04N 5/2251* (2013.01); *G02B 13/0065* (2013.01); *G02B 27/1013* (2013.01); *G02B 27/646* (2013.01); *H04N 5/2252* (2013.01); *H04N 5/2253* (2013.01); *H04N 5/2254* (2013.01); *H04N 5/23248* (2013.01); *H04N 9/045* (2013.01)

(58) Field of Classification Search
CPC .......... H04N 5/2251–5/2254; H04N 5/23248; G02B 13/001; G02B 13/0065; G02B 13/008; G02B 27/1013; G02B 27/646
USPC .................................................. 348/265, 337
See application file for complete search history.

(56) References Cited

U.S. PATENT DOCUMENTS 4,926,249 A * 5/1990 Ichihara et al. ............... 358/511
6,975,353 B1 * 12/2005 Milinusic et al. ........... 348/218.1
(Continued)

FOREIGN PATENT DOCUMENTS

JP    2007-6318    1/2007
JP    2008-76484    4/2008
(Continued)

OTHER PUBLICATIONS

Office Action issued Apr. 14, 2015 in Japanese Patent Application No. 2013-051597 (with English translation).

*Primary Examiner* — Daniel M Pasiewicz
(74) *Attorney, Agent, or Firm* — Oblon, McClelland, Maier & Neustadt, L.L.P.

(57) ABSTRACT

Certain embodiments provide a camera module including a housing of a substantially cuboid shape, a light reflecting portion, a plurality of solid-state imaging device, a lens, and an optical spectroscope. The light reflecting portion is arranged inside the housing and reflects the light incident from the opening portion which is formed on a top surface of the housing, in a direction parallel to a longitudinal direction of the housing. Each of a plurality of solid-state imaging devices has a light receiving surface which is provided in the housing vertically to the bottom surface of the housing. The lens is arranged inside the housing such that an optical axis is parallel to the longitudinal direction of the housing. The optical spectroscope is arranged inside the housing and separates the light which has passed through the lens into lights.

20 Claims, 7 Drawing Sheets

(51) Int. Cl.
  *H04N 9/04* (2006.01)
  *G02B 27/64* (2006.01)
  *G02B 27/10* (2006.01)
  *G02B 13/00* (2006.01)

(56) References Cited

U.S. PATENT DOCUMENTS

| | | |
|---|---|---|
| 7,006,132 B2* | 2/2006 | Pereira et al. ............... 348/218.1 |
| 8,120,693 B2* | 2/2012 | Nomura et al. ............... 348/335 |
| 8,373,936 B2 | 2/2013 | Shigemitsu et al. |
| 2002/0067426 A1* | 6/2002 | Nagata et al. ................ 348/373 |
| 2004/0105025 A1* | 6/2004 | Scherling ....................... 348/335 |
| 2004/0141065 A1* | 7/2004 | Hara et al. ................ 348/208.11 |
| 2005/0057659 A1* | 3/2005 | Hasegawa ................. 348/208.11 |
| 2006/0092524 A1* | 5/2006 | Konno ........................... 359/678 |
| 2007/0024739 A1* | 2/2007 | Konno ........................... 348/337 |
| 2007/0092235 A1* | 4/2007 | Misawa ........................... 396/55 |
| 2007/0126911 A1* | 6/2007 | Nanjo ........................... 348/335 |
| 2009/0041451 A1* | 2/2009 | Miyamoto ..................... 396/493 |
| 2010/0054101 A1* | 3/2010 | Oe et al. ........................ 369/100 |
| 2011/0141346 A1 | 6/2011 | Ryu |
| 2011/0249171 A1 | 10/2011 | Shigemitsu et al. |
| 2012/0008934 A1 | 1/2012 | Kawasaki |
| 2012/0092624 A1* | 4/2012 | Oiwa et al. ...................... 353/31 |
| 2014/0218799 A1* | 8/2014 | Suzuka ........................ 359/557 |

FOREIGN PATENT DOCUMENTS

| | | |
|---|---|---|
| JP | 2008-96559 | 4/2008 |
| JP | 2008-306350 A | 12/2008 |
| JP | 2009-165074 A | 7/2009 |
| JP | 2011-123497 A | 6/2011 |
| JP | 2011-221355 A | 11/2011 |
| JP | 2012-018993 A | 1/2012 |

* cited by examiner

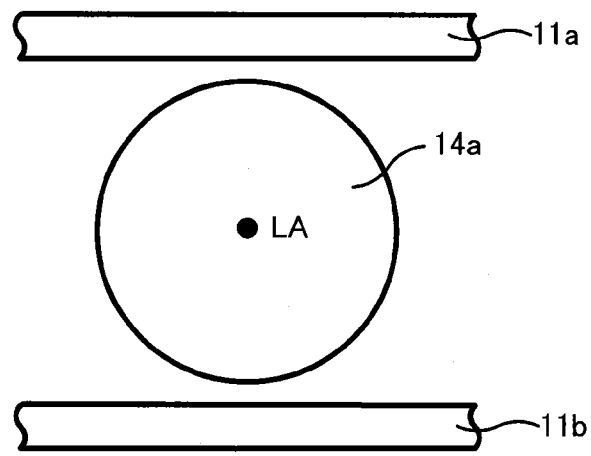
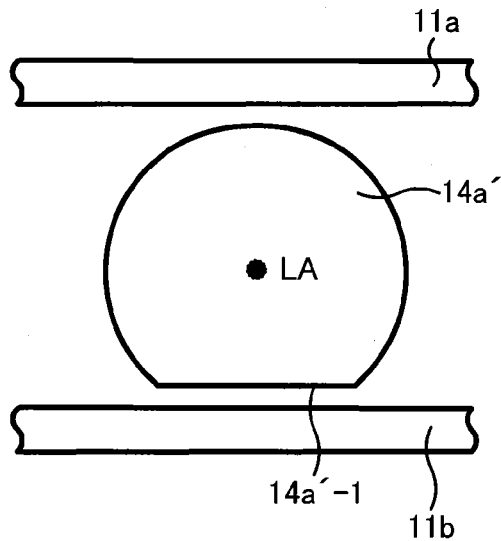
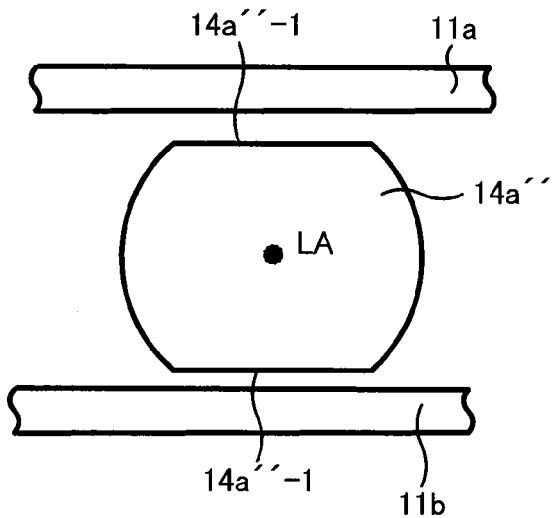

CAMERA MODULE

CROSS REFERENCE TO RELATED APPLICATIONS

This application is based upon and claims the benefit of priority from the prior Japanese Patent Application No. 2013-051597 filed in Japan on Mar. 14, 2013; the entire contents of which are incorporated herein by reference.

FIELD

Embodiments described herein relate generally to camera module.

BACKGROUND

A conventional camera module which is mounted on an electronic device such as, for example, a mobile telephone is a so-called vertical camera module. In the vertical camera module, lens is arranged above a substrate on which solid-state imaging devices such as CMOS sensors are arranged such that optical axes of the lens is in parallel to a traveling direction of incident light. This vertical camera module causes light which is incident on a light receiving surface of the solid-state imaging device from a substantially vertical direction to travel in the substantially vertical direction with respect to the light receiving surface, and receives the light at the solid-state imaging device.

To make resolution of this conventional vertical camera module higher, it is necessary to make the thicknesses of the lenses to be arranged thicker.

Further, to make resolution of this conventional vertical camera module higher, it is necessary to overlay and arrange a plurality of lenses in a vertical direction.

However, when the resolution of the camera module is made higher, there is a problem that the camera module becomes thick.

BRIEF DESCRIPTION OF THE DRAWINGS

FIG. 3 is a plan view of one of the lenses, the lenses forming a lens group as seen from an X axis direction;

FIGS. 4A and 4B are views illustrating a modified example of a lens;

DESCRIPTION OF THE EMBODIMENTS

Certain embodiments provide a camera module including a housing of a substantially cuboid shape, a light reflecting portion, a plurality of solid-state imaging device, a lens, and an optical spectroscope. The housing is formed with a light blocking member which blocks light and which has an opening portion in a top surface. The light reflecting portion is arranged inside the housing, and reflects the light incident from the opening portion of the housing, in a direction parallel to a longitudinal direction of the housing. Each of a plurality of solid-state imaging devices has a light receiving surface which is provided in the housing vertically to the bottom surface of the housing. The lens is arranged between the light reflecting portion and the plurality of solid-state imaging devices inside the housing such that an optical axis of the lens is parallel to the longitudinal direction of the housing. The optical spectroscope is arranged between the lens and the plurality of solid-state imaging devices inside the housing, and separates the light which has passed through the lens into lights which have wavelength regions being different from each other.

Certain embodiments provide a camera module including a housing of a substantially cuboid shape, a light reflecting portion, a solid-state imaging device, and an I-cut lens. The housing is formed with a light blocking member which blocks light and which has an opening portion in a top surface. The light reflecting portion is arranged inside the housing, and reflects the light incident from the opening portion of the housing, in a direction parallel to a longitudinal direction of the housing. The solid-state imaging device has a light receiving surface which is provided in the housing vertically to the bottom surface of the housing. The I-cut lens is arranged between the light reflecting portion and the solid-state imaging device inside the housing, such that an optical axis of the I-cut lens is parallel to a longitudinal direction of the housing, and has linear portions parallel to the top surface and the bottom surface of the housing at two portions of the outer periphery of the lens.

The camera modules according to the present embodiment will be described below with reference to the drawings.

First Embodiment

Figure 1:
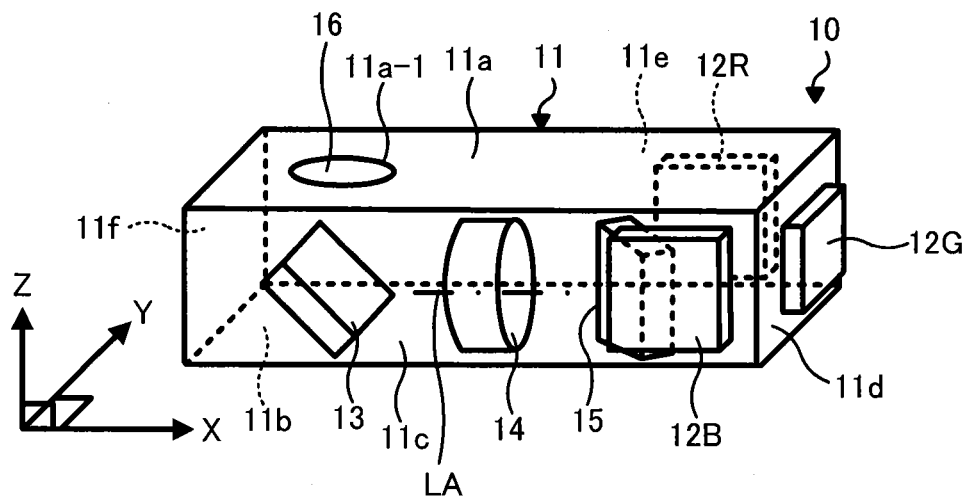
FIG. 1 is a schematic configuration diagram illustrating a camera module according to a first embodiment.
Figure 2:
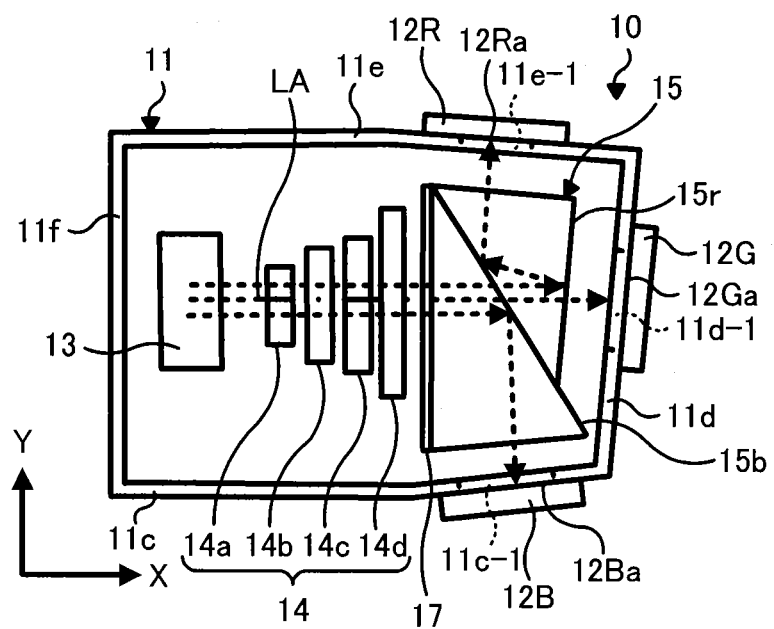
FIG. 2 is a plan view of the camera module according to the first embodiment as seen from above.

FIG. 1 is a schematic configuration diagram illustrating a camera module according to a first embodiment. FIG. 2 is a plan view of the camera module according to the first embodiment as seen from above. As illustrated in FIGS. 1 and 2, in a camera module 10 according to the present embodiment, a housing 11 has a plurality of solid-state imaging devices 12B, 12G, and 12R. Further, in the camera module 10 according to the present embodiment, a light reflecting portion 13, a lens group 14 and an optical spectroscope portion 15 are arranged inside the housing 11.

The housing 11 has a substantially cuboid shape which has a top surface 11a, a bottom surface 11b arranged to oppose to the top surface 11a, and a plurality of lateral surfaces (first lateral surface 11c, a second lateral surface 11d, a third lateral surface 11e, and a fourth lateral surface 11f), and is formed with at least a light blocking member.

This housing 11 has a shape which takes one direction parallel to the bottom surface 11b, that is, a direction parallel to an X axis as a longitudinal direction. For example, the length of the housing 11 in an X axis direction is about 10 to 20 mm, the length in a Y axis direction is about 7 mm and the length in a Z axis direction is about 5 mm.

At part of the top surface 11a of the housing 11, for example, an opening portion 11a-1 of a circular shape is provided. In this opening portion 11a-1, an optical transmissive member 16 such as glass is provided to seal up the inside of the housing 11.

Further, among the lateral surfaces vertical to the bottom surface 11b of the housing 11, a first opening portion 11c-1 is provided at part of the first lateral surface 11c which is substantially parallel to the X axis. A second opening portion 11d-1 is provided at part of the second lateral surface 11d opposing to the first lateral surface 11c. And a third opening portion 11e-1 is provided at part of the third lateral surface 11e which is substantially vertical to the X axis (FIG. 2).

In addition, a part which includes an area provided with the first opening portion 11c-1 in the first lateral surface 11c, and a part which includes an area provided with the third opening portion 11e-1 in the third lateral surface 11e are bent in an inner direction of the housing 11. Further, the second lateral surface 11d is provided slightly obliquely to a direction parallel to the Y axis. This shape is taken to allow each of the solid-state imaging devices 12B, 12G, and 12R to receive light emitted from the optical spectroscope portion 15 described below from a vertical direction. Hence, depending on the optical spectroscope portion 15 to be used, the first lateral surface 11c, the second lateral surface 11d, and the third lateral surface 11e may not necessarily take the illustrated shapes.

The plurality of solid-state imaging devices 12B, 12G, and 12R is attached to the lateral surfaces 11c, 11d, and 11e of the housing 11 to cover the first opening portion 11c-1 of the first lateral surface 11c, the second opening portion 11d-1 of the second lateral surface 11d, and the third opening portion 11e-1 of the third lateral surface 11e from an outer side. That is, the plurality of solid-state imaging devices 12B, 12G, and 12R is provided such that the light receiving surfaces 12Ba, 12Ga, and 12Ra (FIG. 2) are substantially vertical to the bottom surface 11b of the housing 11.

The plurality of solid-state imaging devices 12B, 12G, and 12R includes, for example, a first solid-state imaging device 12B which receives only blue light, a second solid-state imaging device 12G which receives only green light, and a third solid-state imaging device 12R which receives only red light. Further, for example, the first solid-state imaging device 12B is provided on an outer side of the first lateral surface 11c to cover the first opening portion 11c-1. The second solid-state imaging device 12G is provided on an outer side of the second lateral surface 11d to cover the second opening portion 11d-1. And the third solid-state imaging device 12R is provided on an outer side of the third lateral surface 11e to cover the third opening portion 11e-1.

In addition, the plurality of solid-state imaging devices 12B, 12G, and 12R only needs to be provided such that the light receiving surfaces 12Ba, 12Ga, and 12Ra are substantially vertical to the bottom surface 11b of the housing 11, and for example, may be provided inside the housing 11. However, by attaching the plurality of solid-state imaging devices 12B, 12G, and 12R on the outer sides of the lateral surfaces 11c, 11d, and 11e according to the present embodiment, it is possible to reduce the size of the housing 11 and improve precision of the positions of the solid-state imaging devices 12B, 12G, and 12R with respect to the optical spectroscope portion 15 described below.

The light reflecting portion 13 is, for example, a mirror, and is provided below the opening portion 11a-1 of the top surface 11a inside the housing 11. The light reflecting portion 13 is obliquely provided on the lower surface 11b of the housing 11 such that light incident from the Z direction through the opening portion 11a-1 to the top surface 11a of the housing 11 travels in the X direction.

The lens group 14 concentrates the light reflected by the light reflecting portion 13, on the plurality of solid-state imaging devices 12B, 12G, and 12B. The lens group 14 is provided between the light reflecting portion 13 and the plurality of solid-state imaging devices 12B, 12G, and 12B inside the housing 11. The lens group 14 includes a plurality of lenses such as four lenses 14a, 14b, 14c, and 14d.

FIG. 3 is a plan view of, for example, the lens 14a as one of the lenses which form the lens group 14 as seen from the X axis direction. As illustrated in FIG. 3, the lens 14a has a shape whose outer periphery is substantially circular.

As Each of FIGS. 4A and 4B illustrates a modified example of, for example, the lens 14a, a lens 14a' may be a lens whose shape has a linear portion 14a'-1 at a part of the outer periphery (FIG. 4A). Further, a lens 14a" may be a so-called I-cut lens 14a" which is a lens whose shape has, at two portions of the outer periphery, linear portions 14a"-1 parallel to each other (FIG. 4B). When the lens 14a' is adopted, the linear portion 14a'-1 is arranged parallel to the top surface 11a or the bottom surface 11b of the housing 11. When the I-cut lens 14a' is adopted, the linear portion 14a"-1 is arranged parallel to the top surface 11a and the bottom surface 11b of the housing 11.

Although each of the FIGS. 4A and 4B illustrates a modified example of one lens 14a which forms the lens group 14, each of the other lenses 14b, 14c, and 14d which forms the lens group 14 may be the lense of the same shape as the lens 14a' or 14a' illustrated in FIG. 4A or 4B. By adopting the lenses 14a' or 14a" according to the modified example, it is possible to reduce the length of the housing 11 in the Z axis direction (it is possible to reduce the height of the housing 11).

The lens group 14 described above is provided inside the housing 11 such that optical axes LA of the lenses 14a, 14b, 14c, and 14d are in parallel to the X axis direction (FIG. 1).

The optical spectroscope portion 15 is, for example, a dichroic mirror 15. The dichroic mirror 15 separates a light which has passed through the lens group 14 into lights which have predetermined wavelength regions being different from each other and reflects the different wavelength of lights in directions being different from each other.

Figure 5:
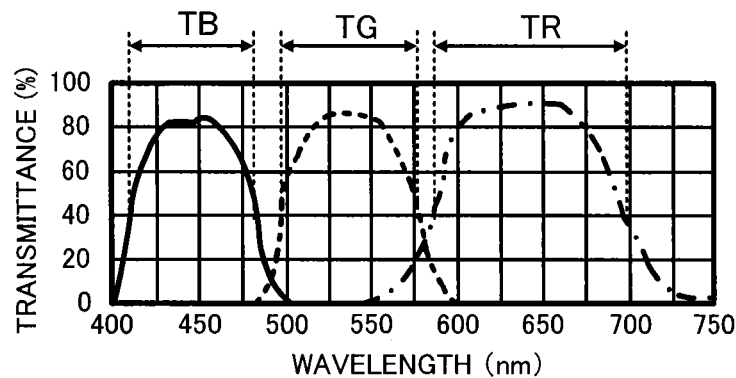
FIG. 5 is a view illustrating transmission characteristics of a dichroic mirror.

FIG. 5 is a view illustrating transmission characteristics of the dichroic mirror 15. As illustrated in FIG. 5, the dichroic mirror 15 has transmission characteristics which include an area TB which allows transmission of blue light, an area TG which allows transmission of green light, and an area TG which allows transmission of red light. This dichroic mirror 15 emits blue light, green light, and red light in different directions.

FIG. 2 will be referred to again. As illustrated in FIG. 2, the dichroic mirror 15 has a blue light reflection filter 15b which reflects blue light and a red light reflection filter 15r which reflects red light. The blue light reflection filter 15b is provided to reflect a blue component of light which has passed through the lens group 14 in a direction in which the first solid-state imaging device 12B which receives only blue light is arranged, and the red light reflection filter 15r is provided to reflect a red component of light which has passed through the lens group 14 in a direction in which the third solid-state imaging device 12R which receives only red light is arranged. When the light which has transmitted through the lens group 14 is incident on this dichroic mirror 15, the blue component is reflected by the blue light reflection filter 15b and is transmitted in the direction in which the first solid-state imaging device 12B is arranged, and the red component is reflected by the red light reflection filter 15r and is transmitted in the direction in which the third solid-state imaging device 12R is arranged. Further, the green component transmits through the blue light reflection filter 15b and the red light reflection filter 15r, and transmitted in a direction in which the second solid-state imaging device 12G is arranged.

In addition, for example, on an incidence surface of the dichroic mirror 15, the infrared reflection filter 17 is provided. The position of the infrared reflection filter 17 is not limited to this position, and only needs to be provided between the lens group 14 and the incidence surface of the dichroic mirror 15 inside the housing 11.

When light is incident in the above-described camera module 10 from the Z axis direction through the opening portion 11a-1 of the top surface 11a of the housing 11, the incident light is reflected in the X axis direction by the light reflecting portion 13. When the light traveling in the X axis direction is incident on the optical spectroscope portion 15 through the lens group 14, this light is separated into, for example, red light, green light, and blue light. And the blue light is concentrated on the first solid-state imaging devices 12B, the green light is concentrated on the second solid-state imaging devices 12G, the red light is concentrated on the third solid-state imaging devices 12R. When each of the first to third solid-state imaging devices 12B, 12G, and 12R receives the light, each of the solid-state imaging devices 12B, 12G, and 12R forms image information of color based on the received light. By combining these pieces of image information of the color, a color image is formed.

According to the camera module 10 according to the first embodiment described above, the lens group 14 is arranged so that the optical axes LA of the lenses 14a, 14b, 14c, and 14d which form the lens group 14 are arranged parallel to the X axis direction. Consequently, even when the number of lenses which form the lens group 14 is increased or the thicknesses of the lenses 14a, 14b, 14c, and 14d are increased to make resolution of the camera module 10 higher, it is suppressed that the camera module 10 becomes larger in the Z axis direction. Consequently, it is possible to provide a thin camera module of high resolution.

Further, the camera module 10 according to the first embodiment separates incident light into blue light, green light, and red light. Furthermore, the first solid-state imaging device 12B receives only blue light, the second solid-state imaging device 12G receives only green light, and the third solid-state imaging device 12R receives only red light. Consequently, compared to a conventional vertical camera module which has a solid-state imaging device having the same size as the first solid-state imaging devices 12B, the second solid-state imaging devices 12G or the third solid-state imaging devices 12R, it is possible to improve resolution and improve color reproducibility.

Second Embodiment

Figure 6:
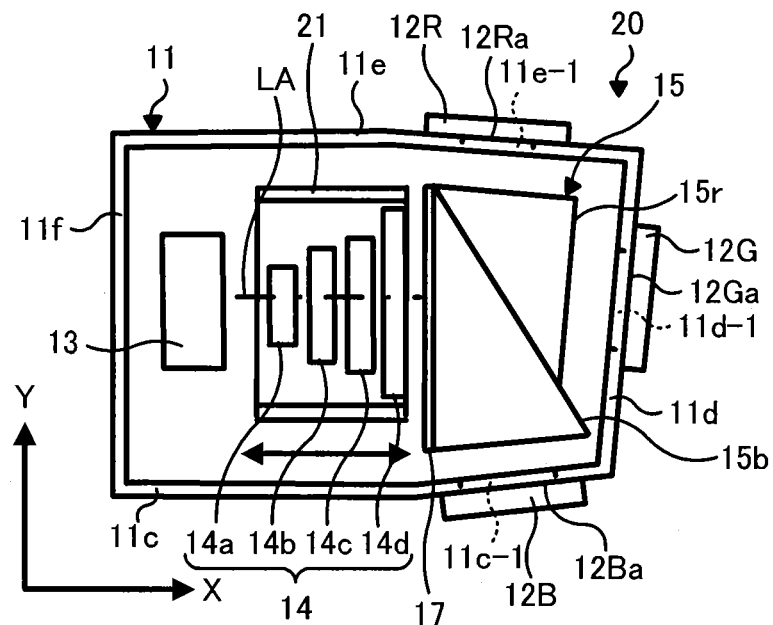
FIG. 6 is a plan view of the camera module according to the second embodiment as seen from above.

FIG. 6 is a plan view of a camera module according to a second embodiment as seen from above. A camera module 20 illustrated in FIG. 6 is a camera module that adds an autofocus function in a camera module 10 according to the first embodiment. In FIG. 6, the same portions as in the camera module 10 illustrated in FIG. 2 will be assigned the same reference numerals.

As illustrated in FIG. 6, in the camera module 20 according to the second embodiment, a lens group moving mechanism 21 is provided around the lens group 14. The lens group moving mechanism 21 is, for example, a VCM 21 (voice coil motor).

Figure 7:
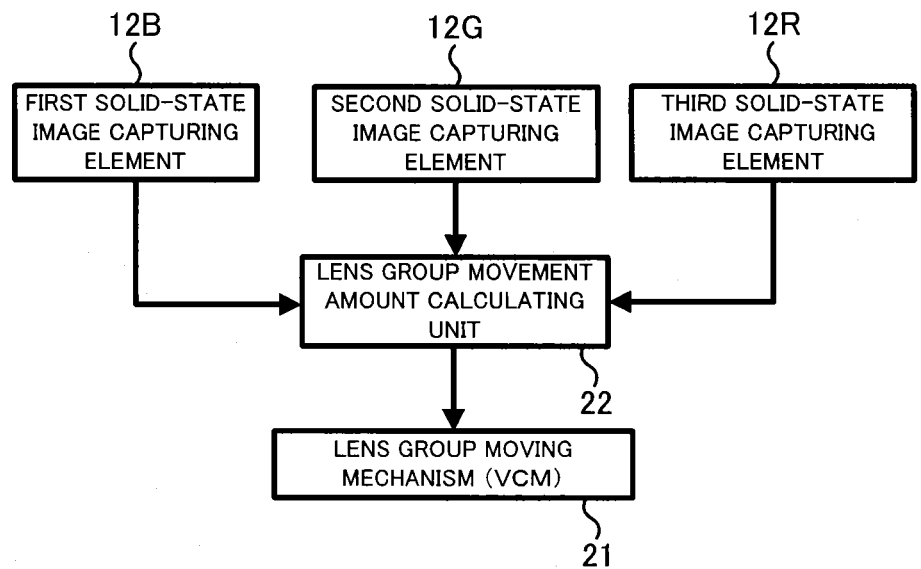
FIG. 7 is an electrical block diagram illustrating a control system which moves a lens group.

FIG. 7 is an electrical block diagram illustrating a control system which moves the lens group 14. As illustrated in FIG. 7, first to third solid-state imaging devices 12B, 12G, and 12R are connected with a lens group movement amount calculating unit 22 which calculates a movement amount of the lens group 14. Further, the lens group movement amount calculating unit 22 is connected with the VCM 21 as the lens group moving mechanism 21. The lens group movement amount calculating unit 22 may be provided inside a housing 11 or outside the housing 11.

Figure 8:
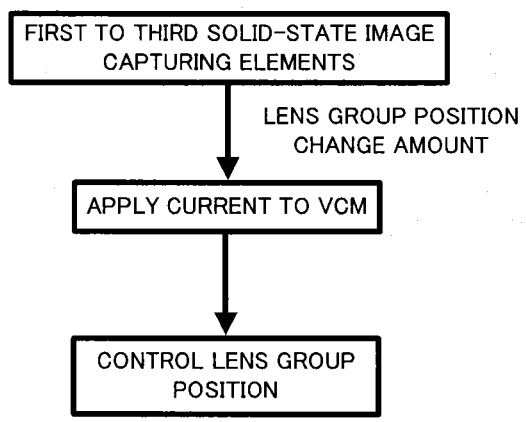
FIG. 8 is a view for explaining a method of realizing an autofocus function.

FIG. 8 is a view for explaining a method of realizing an autofocus function. The method of realizing the autofocus function will be described below with reference to above FIGS. 7 and 8.

When the first to third solid-state imaging devices 12B, 12G, and 12R form image information, these pieces of information are sent to the lens group movement amount calculating unit 22. The lens group movement amount calculating unit 22 calculates a moving distance (lens group position change amount) of the lens group 14 at which the lens group 14 moves to a focus position based on the image information obtained by the first to third solid-state imaging devices 12B, 12G, and 12R. The lens group movement amount calculating unit 22 applies a current to the VCM 21 as the lens group moving mechanism 21 based on information related to the calculated moving distance of the lens group 14. By this means, the VCM 21 controls the position of the lens group 14. That is, the VCM 21 moves the lens group 14 to a desired position. The camera module 20 according to the second embodiment realizes the autofocus function in this way.

Even in the camera module 20 according to the second embodiment described above, the lens group 14 is arranged so that optical axes LA of lenses 14a, 14b, 14c, and 14d which form the lens group 14 are arranged parallel to the X axis direction. Consequently, even when the number of lenses which form the lens group 14 is increased or the thicknesses of the lenses 14a, 14b, 14c, and 14d are increased to make resolution of the camera module 20 higher, it is suppressed that the camera module 20 becomes larger in the Z axis direction. Consequently, it is possible to provide a thin camera module of high resolution.

Further, the camera module 20 according to the second embodiment separates incident light into blue light, green light, and red light. Furthermore, the first solid-state imaging device 12B receives only blue light, the second solid-state imaging device 12G receives only green light, and the third solid-state imaging device 12R receives only red light. Consequently, compared to the conventional vertical camera module which has solid-state imaging devices having the same size as the first solid-state imaging devices 12B, the second solid-state imaging devices 12G or the third solid-state imaging devices 12R, it is possible to improve resolution and improve color reproducibility.

Third Embodiment

Figure 9:
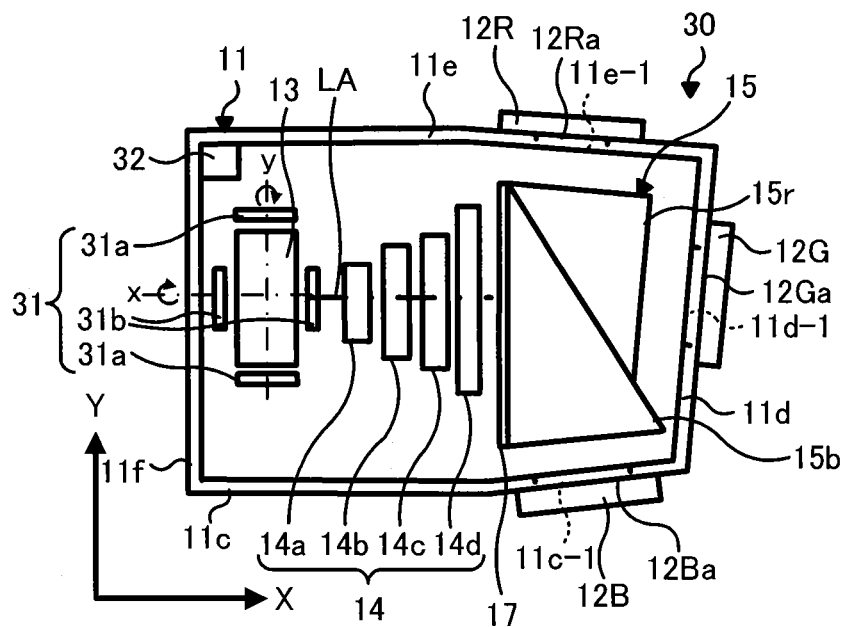
FIG. 9 is a plan view of the camera module according to the third embodiment as seen from above.

FIG. 9 is a plan view of the camera module according to the third embodiment as seen from above. A camera module 30 illustrated in FIG. 9 is a camera module that adds an optical image stabilization (OIS) function in a camera module 10 according to the first embodiment. In FIG. 9, the same portions as in the camera module 10 illustrated in FIG. 2 will be assigned the same reference numerals.

As illustrated in FIG. 9, in the camera module 30 according to the third embodiment, a light reflecting portion moving mechanisms 31 is provided around a light reflecting portion 13. The light reflecting portion moving mechanism 31 has, for example, a first VCM 31a which is provided on both sides of the light reflecting portion 13 and rotates the light reflecting portion 13 around a rotation axis y parallel to a Y axis, and a second VCM 31b which is provided in front of and at the back of the light reflecting portion 13 and rotates the light reflecting portion 13 around a rotation axis x parallel to an X axis. In the following description, a rotation direction of the light reflecting portion 13 rotated by the first VCM 31a is referred to as a first rotation direction, and a rotation direction of the light reflecting portion 13 rotated by the second VCM 31b is referred to as a second rotation direction.

Further, inside a housing 11, a gyro sensor 32 which detects an inclination of the housing 11 is provided.

Figure 10:
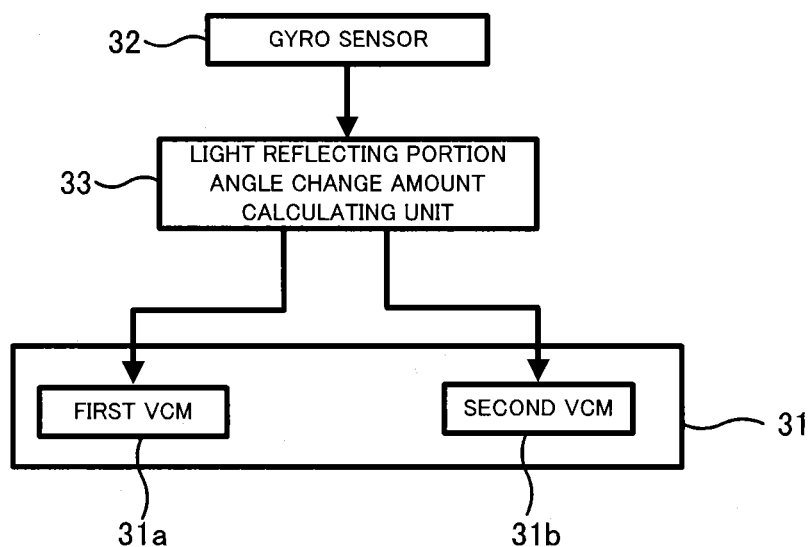
FIG. 10 is an electrical block diagram illustrating a control system which moves a light reflecting portion.

FIG. 10 is an electrical block diagram illustrating a control system which moves the light reflecting portion 13. As illustrated in FIG. 10, the gyro sensor 32 is connected with a light reflecting portion angle change amount calculating unit 33 which calculates an angle change amount of the light reflecting portion 13. Further, the light reflecting portion angle change amount calculating unit 33 is connected with the first VCM 31a and the second VCM 31b which are the light reflecting portion moving mechanism 31. The light reflecting portion angle change amount calculating unit 33 may be provided inside the housing 11 or outside the housing 11.

Figure 11:
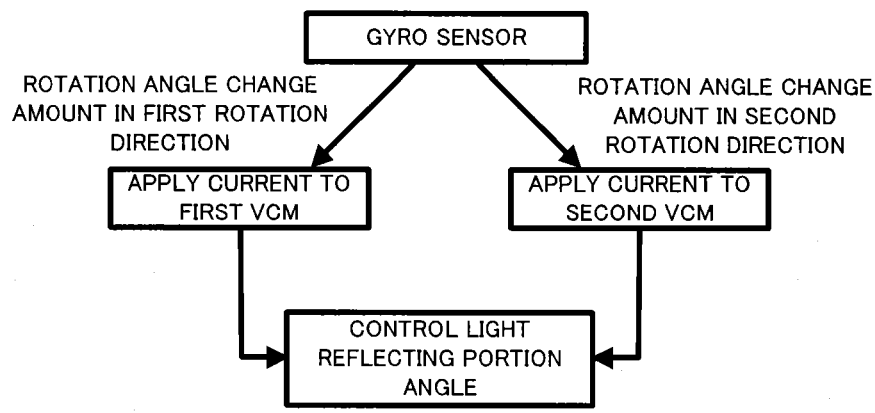
FIG. 11 is a view for explaining a method of realizing an optical image stabilization function.

FIG. 11 is a view for explaining a method of realizing the optical image stabilization function. The method of realizing the optical image stabilization function will be described below with reference to above FIGS. 10 and 11.

When the gyro sensor 32 detects an inclination of the housing 11, detected inclination information is sent to the light reflecting portion angle change amount calculating unit 33. The light reflecting portion angle change amount calculating unit 33 calculates a rotation angle change amount of the light reflecting portion 13 in the first direction and a rotation angle change amount of the light reflecting portion 13 in the second direction, based on the inclination information of the housing 11 obtained by the gyro sensor 32. The rotation angle change amounts are calculated by the light reflecting portion angle change amount calculating unit 33 based on the following principle.

Figure 12:
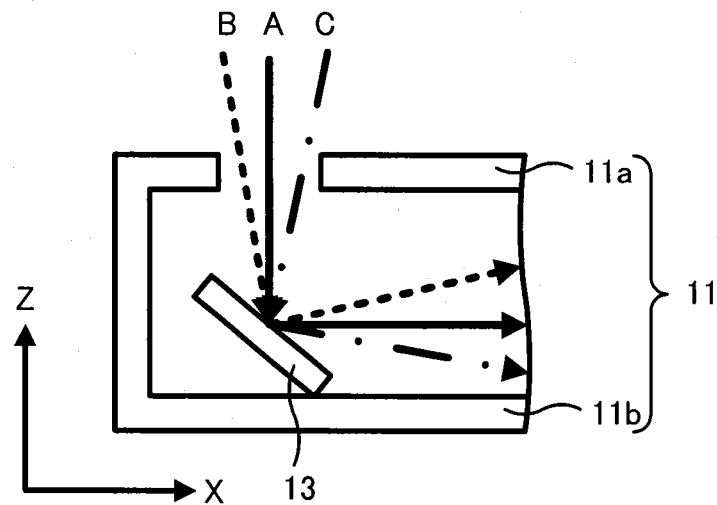
FIG. 12 is a view for explaining a principle of calculating rotation angle change amounts by a light reflecting portion angle change amount calculating unit.

FIG. 12 is a view for explaining a principle of calculating rotation angle change amounts by the light reflecting portion angle change amount calculating unit 33, and is an enlarged view of the light reflecting portion 13 of the camera module 30 and the vicinity thereof. As illustrated in FIG. 12, when the housing 11 is not inclined, as indicated by a solid line arrow A in FIG. 12, light is incident in the housing 11 from a direction substantially parallel to the Z axis. The light reflecting portion 13 reflects light which is incident in this way in a direction substantially parallel to the X axis.

However, when the housing 11 is inclined, as indicated by a dotted line arrow B in FIG. 12 or a dashed line arrow C in FIG. 12, light is incident in the housing 11 from a direction inclined with respect to the Z axis. If the light reflecting portion 13 is fixed, light which is incident in this way is reflected in a direction inclined with respect to the X axis. The light traveling in the direction inclined with respect to the X axis is not concentrated at a desired position by the lens group 14. This deteriorates quality of an image obtained by the camera module 30.

Hence, the light reflecting portion angle change amount calculating unit 33 calculates the angle of the light reflecting portion 13 and calculates the rotation angle change amount of the light reflecting portion 13 such that light incident from the direction inclined with respect to the Z axis as indicated by the dotted line arrow B in FIG. 12 or the dashed line arrow C in FIG. 12 is reflected in the direction substantially parallel to the X axis as indicated by the solid line arrow in FIG. 12.

FIGS. 10 and 11 will be referred to. The light reflecting portion angle change amount calculating unit 33 applies a current to the first VCM 31a based on the rotation angle change amount in the first direction, and applies a current to the second VCM 31b based on the rotation angle change amount in the second direction. By this means, the first VCM 31a and the second VCM 31b control the angle of the light reflecting portion 13. That is, the light reflecting portion 13 is moved such that the light reflecting portion 13 is at a desired angle. The camera module 30 according to the third embodiment realizes the optical image stabilization function in this way.

Even in the camera module 30 according to the third embodiment described above, the lens group 14 is arranged so that optical axes LA of lenses 14a, 14b, 14c, and 14d which form the lens group 14 are arranged parallel to the X axis direction. Consequently, even when the number of lenses which form the lens group 14 is increased or the thicknesses of the lenses 14a, 14b, 14c, and 14d are increased to make resolution of the camera module 30 higher, it is suppressed that the camera module 30 becomes larger in the Z axis direction. Consequently, it is possible to provide a thin camera module of high resolution.

Further, the camera module 30 according to the third embodiment separates incident light into blue light, green light, and red light. Furthermore, the first solid-state imaging device 12B receives only blue light, the second solid-state imaging device 12G receives only green light, and the third solid-state imaging device 12R receives only red light. Consequently, compared to the conventional vertical camera module which has solid-state imaging devices having the same size as the first solid-state imaging devices 12B, the second solid-state imaging devices 12G or the third solid-state imaging devices 12R, it is possible to improve resolution and improve color reproducibility.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 13:
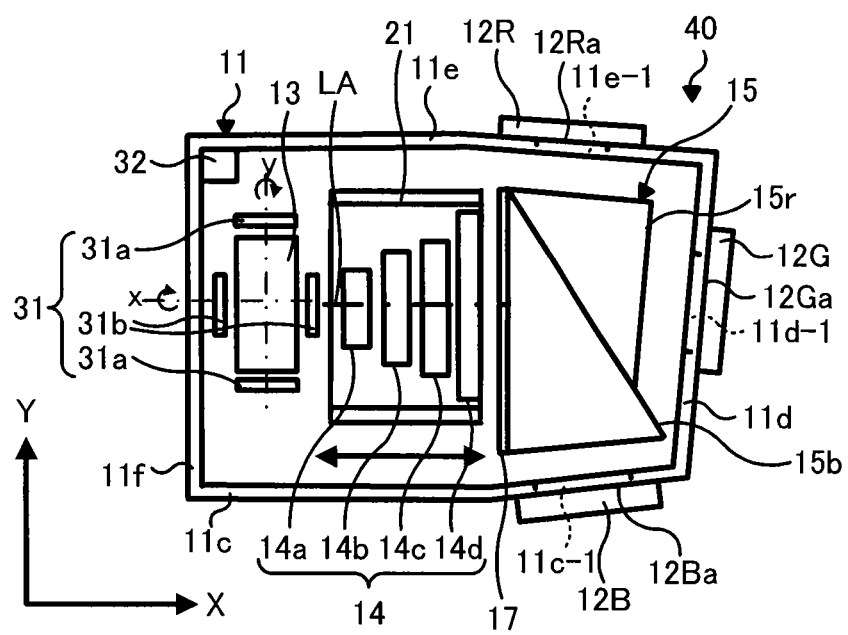
FIG. 13 is a plan view of a camera module according to another embodiment as seen from above.

For example, the camera module 20 which has the autofocus function has been described in the second embodiment, and the camera module 30 which has the optical image stabilization function has been described in the third embodiment. However, the camera module according to the embodiments of the present invention may be a camera module 40 which has these functions (the autofocus function and the optical image stabilization function) in combination as illustrated in FIG. 13.

What is claimed is:

1. A camera module comprising:
   a housing of a substantially cuboid shape which is formed with a light blocking member which blocks light and which has an opening portion in a top surface;
   a light reflecting portion which is arranged inside the housing, the light reflecting portion reflecting the light incident from the opening portion of the housing, in a direction parallel to a longitudinal direction of the housing;

a plurality of solid-state imaging devices each of which has a light receiving surface which is provided in the housing vertically to the bottom surface of the housing;

a lens which is arranged between the light reflecting portion and the plurality of solid-state imaging devices inside the housing such that an optical axis of the lens is parallel to the longitudinal direction of the housing; and an optical spectroscope which is arranged between the lens and the plurality of solid-state imaging devices inside the housing, the optical spectroscope separating the light which has passed through the lens into lights which have wavelength regions being different from each other.

2. The camera module according to claim 1, wherein
the housing have a plurality of opening portions in a plurality of lateral surfaces of the housing, and
each of the solid-state imaging devices is provided so as to cover the opening portion of the lateral surface from an outer side of the lateral surface.

3. The camera module according to claim 1, wherein
the plurality of solid-state imaging devices comprises a first solid-state imaging device which receives blue light, a second solid-state imaging device which receives green light, and a third solid-state imaging device which receives red light.

4. The camera module according to claim 3, wherein
the optical spectroscope has a blue light reflection filter which reflects the blue light and a red light reflection filter which reflects the red light, the optical spectroscope separating the light which has passed through the lens into the red light, the green light, and the blue light.

5. The camera module according to claim 4, wherein
the optical spectroscope further has an infrared reflection filter which reflects an infrared ray.

6. The camera module according to claim 1, wherein
the lens has a linear portion parallel to the top surface or the bottom surface of the housing at an outer periphery of the lens.

7. The camera module according to claim 1, wherein
the lens is an I-cut lens which has linear portions parallel to the top surface and the bottom surface of the housing at two portions of an outer periphery of the lens.

8. The camera module according to claim 7, wherein
the lens is a lens group which comprises a plurality of I-cut lenses.

9. The camera module according to claim 1, further comprising
a lens group moving mechanism which controls a position of the lens.

10. The camera module according to claim 9, wherein
the lens group moving mechanism controls a position of the lens group based on image information obtained by the plurality of solid-state imaging devices such that the lights which have passed through the lens concentrate on the light receiving surfaces of the plurality of solid-state imaging devices.

11. The camera module according to claim 1, further comprising
a gyro sensor which detects an inclination of the housing; and
a light reflecting portion moving mechanism which controls an angle of the light reflecting portion.

12. The camera module according to claim 11, wherein
the light reflecting portion moving mechanism controls the angle of the light reflecting portion based on inclination information of the housing obtained by the gyro sensor such that the light reflected by the light reflecting portion travels in a desired direction.

13. A camera module comprising:
a housing of a substantially cuboid shape which is formed with a light blocking member which blocks light and which has an opening portion in a top surface;
a light reflecting portion which is arranged inside the housing, the light reflecting portion reflecting the light incident from the opening portion of the housing, in a direction parallel to a longitudinal direction of the housing;
a solid-state imaging device which has a light receiving surface which is provided in the housing vertically to the bottom surface of the housing; and
an I-cut lens which is arranged between the light reflecting portion and the solid-state imaging device inside the housing such that an optical axis of the I-cut lens is parallel to the longitudinal direction of the housing, and which has linear portions parallel to the top surface and the bottom surface of the housing at two portions of an outer periphery of the lens.

14. The camera module according to claim 13, wherein
a plurality of I-cut lenses are provided inside the housing.

15. The camera module according to claim 13, wherein
a plurality of solid-state imaging devices are provided in the housing.

16. The camera module according to claim 15, wherein
the housing have a plurality of opening portions in a plurality of lateral surfaces of the housing, and
each of the solid-state imaging devices is provided so as to cover the opening portion of the lateral surface from an outer side of the lateral surface.

17. The camera module according to claim 16, wherein
the plurality of solid-state imaging devices comprises a first solid-state imaging device which receives blue light, a second solid-state imaging device which receives green light, and a third solid-state imaging device which receives red light; and
the camera module further has an optical spectroscope which is arranged between the I-cut lens and the plurality of solid-state imaging devices inside the housing, and has a blue light reflection filter which reflects the blue light and a red light reflection filter which reflects the red light, the optical spectroscope separating the light which has passed through the lens into the red light, the green light, and the blue light.

18. The camera module according to claim 17, wherein
the optical spectroscope further has an infrared reflection filter which reflects an infrared ray.

19. The camera module according to claim 13, further comprising
a lens group moving mechanism which controls a position of the I-cut lens such that the light which has passed through the I-cut lens concentrates on the light receiving surface of the solid-state imaging device.

20. The camera module according to claim 13, further comprising
a gyro sensor which detects an inclination of the housing; and
a light reflecting portion moving mechanism which controls an angle of the light reflecting portion.

* * * * *